United States Patent
Kulmer et al.

(10) Patent No.: US 11,899,128 B2
(45) Date of Patent: Feb. 13, 2024

(54) FREQUENCY RESPONSE CALIBRATION FOR RADIO FREQUENCY INTEGRATED CIRCUIT WITH MULTIPLE RECEIVING CHANNELS

(71) Applicant: Infineon Technologies AG, Neubiberg (DE)

(72) Inventors: Josef Kulmer, Graz (AT); Patrick Hoelzl, Amstetten (AT); Timo Haf, Munich (DE)

(73) Assignee: Infineon Technologies AG, Neubiberg (DE)

( * ) Notice: Subject to any disclaimer, the term of this patent is extended or adjusted under 35 U.S.C. 154(b) by 252 days.

(21) Appl. No.: 17/406,645

(22) Filed: Aug. 19, 2021

(65) Prior Publication Data

US 2023/0057105 A1 Feb. 23, 2023

(51) Int. Cl.
*G01S 7/40* (2006.01)
*H04B 17/29* (2015.01)
*H04B 17/21* (2015.01)

(52) U.S. Cl.
CPC .............. *G01S 7/40* (2013.01); *G01S 7/4069* (2021.05); *H04B 17/21* (2015.01); *H04B 17/29* (2015.01)

(58) Field of Classification Search
CPC ......... G01S 7/40; G01S 7/4069; H04B 17/21; H04B 17/29
See application file for complete search history.

(56) References Cited

U.S. PATENT DOCUMENTS

| 9,929,739 B1 | 3/2018 | Zanchi |
| 10,225,073 B1 | 3/2019 | Martens et al. |
| 2012/0268299 A1* | 10/2012 | Kidambi ............. H03M 1/1052 341/155 |

FOREIGN PATENT DOCUMENTS

WO 9404940 A1 3/1994

\* cited by examiner

*Primary Examiner* — Timothy X Pham
(74) *Attorney, Agent, or Firm* — Slater Matsil, LLP (57) ABSTRACT

A method of calibrating an analog front end (AFE) filter of a radio frequency integrated circuit (RFIC) includes: making a first measurement of the RFIC at a first measuring frequency while the AFE filter is bypassed; generating a first amplitude estimate and a first phase estimate at the first measuring frequency using the first measurement; making a second measurement of the RFIC at the first measuring frequency while the AFE filter is turned on; generating a second amplitude estimate and a second phase estimate at the first measuring frequency using the second measurement; and calculating a frequency response of the AFE filter at the first measuring frequency, which includes calculating an amplitude response of the AFE filter based on the second amplitude estimate and the first amplitude estimate; and calculating a phase response of the filter based on the first phase estimate and the second phase estimate.

17 Claims, 7 Drawing Sheets

FREQUENCY RESPONSE CALIBRATION FOR RADIO FREQUENCY INTEGRATED CIRCUIT WITH MULTIPLE RECEIVING CHANNELS

TECHNICAL FIELD

The present invention relates generally to systems and methods for frequency response calibration for a radio frequency integrated circuit (RFIC) with multiple receiving channels.

BACKGROUND

Applications in the millimeter-wave frequency regime have gained significant interest in the past few years due to the rapid advancement in low cost semiconductor technologies such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at 60 GHz, 77 GHz, and 80 GHz and also beyond 100 GHz. Such applications include, for example, automotive radar systems and multi-gigabit communication systems.

Radar is used for different applications such as target identification/tracking, positioning, monitoring of physical conditions, or motion/gesture sensing. Radar systems using RFICs have been widely deployed in autonomous driving vehicles. The ability to easily characterize the frequency responses of the RFICs may improve system performance, e.g., by allowing monitoring and compensation of the frequency characteristics of the RFICs, either at the manufacturing facility or in the field. Conventional calibration methods for RFICs may be costly and timing consuming, and may not be applicable for devices already deployed in the field. There is a need in the art for easy, accurate, and cost-effective calibration methods for RFICs.

SUMMARY

In accordance with an embodiment, a method of calibrating a radio frequency integrated circuit (RFIC) having multiple receiving channels is disclosed, where each of the receiving channels has a mixer, an analog front end (AFE) filter coupled to the mixer, and an analog-to-digital converter (ADC) coupled to the AFE filter, where the method includes: making a first measurement of the RFIC at a first measuring frequency; generating a first amplitude estimate and a first phase estimate for a first receiving channel of the RFIC at the first measuring frequency using the first measurement, wherein a first AFE filter of the first receiving channel is bypassed while the first measurement is being made; making a second measurement of the RFIC at the first measuring frequency; generating a second amplitude estimate and a second phase estimate for the first receiving channel at the first measuring frequency using the second measurement, wherein the first AFE filter of the first receiving channel is turned on while the second measurement is being made; and calculating a frequency response of the first AFE filter at the first measuring frequency, comprising: calculating an amplitude response of the first AFE filter at the first measuring frequency based on the second amplitude estimate and the first amplitude estimate; and calculating a phase response of the first AFE filter at the first measuring frequency based on the first phase estimate and the second phase estimate.

In accordance with an embodiment, a method of characterizing a radio frequency integrated circuit (RFIC) having multiple receiving channels is disclosed, wherein each of the receiving channels has a mixer, an analog front end (AFE) filter coupled to the mixer, and an analog-to-digital converter (ADC) coupled to the AFE filter, wherein the method includes: bypassing a first AFE filter in a first receiving channel of the RFIC and bypassing a second AFE filter in a second receiving channel of the RFIC; calculating a first frequency estimate of the RFIC at a first measuring frequency using first data captured by the ADCs of the RFIC while the first AFE filter and the second AFE filter are bypassed, wherein the first frequency estimate comprises a first amplitude estimate and a first phase estimate for the first receiving channel, and comprises a second phase estimate for the second receiving channel; enabling the first AFE filter in the first receiving channel and bypassing the second AFE filter in the second receiving channel; calculating a second frequency estimate of the RFIC at the first measuring frequency using second data captured by the ADCs while the first AFE filter is enabled and the second AFE filter is bypassed, wherein the second frequency estimate comprises a third amplitude estimate and a third phase estimate for the first receiving channel, and comprises a fourth phase estimate for the second receiving channel; and calculating a frequency response of the first AFE filter at the first measuring frequency, comprising: calculating an amplitude response of the first AFE filter based on the first amplitude estimate and the third amplitude estimate; and calculating a phase response of the first AFE filter based on the first phase estimate and the third phase estimate.

In accordance with an embodiment, a radar system includes a first monolithic microwave integrated circuit (MMIC), wherein the first MMIC comprises: a first input terminal configured to receive a local oscillator (LO) signal; a test signal generator (TSG) configured to generate a sinusoidal signal at a user-specified frequency; and a plurality of receiving channels, wherein each of the plurality of receiving channels comprises: a mixer having a normal operation mode and a calibration mode, wherein in the normal operation mode, the mixer is configured to down-convert a radio frequency (RF) signal from an external antenna, wherein in the calibration mode, the mixer is configured to generate a test tone; an analog front end (AFE) filter having a bypass mode and a normal operation mode, wherein in the normal operation mode, the AFE filter is configured to filter an output signal of the mixer and is configured to generate, at an output terminal of the AFE filter, a filtered mixer output signal, wherein in the bypass mode, the AFE filter is bypassed and is configured to pass through, at the output terminal of the AFE filter, the output signal of the mixer; and an analog-to-digital converter (ADC) coupled to the output terminal of the AFE filter. The radar system further includes a controller, wherein the controller is configured to calibrate a first AFE filter in a first receiving channel of the MMIC by: setting a first mixers in a first receiving channel and a second mixer in a second receiving channel in the calibration mode to generate a first test tone in the first receiving channel and a second test tone in the second receiving channel, wherein the first test tone and the second test tone have a first measuring frequency within a frequency band of the first AFE filter; setting a first AFE filter in the first receiving channel and a second AFE filter in the second receiving channel in the bypass mode; calculating a first frequency estimate of the first AFE filter and a second frequency estimate of the second AFE filter using first ADC output data captured when the first AFE filter and the second AFE filter are bypassed; setting the first AFE filter in the normal operation mode and setting the second AFE filter in the bypass mode; calculating a third frequency estimate of the first AFE filter and a fourth frequency estimate of the second AFE filter using second ADC output data captured when the first AFE filter is in the normal operation mode and the second AFE filter is in the bypass mode; and calculating a first amplitude response and a first phase response of the first AFE filter at the first measuring frequency using the first frequency estimate and the third frequency estimate.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EXAMPLES

The making and using of the presently disclosed examples are discussed in detail below. It should be appreciated, however, that the present invention provides many applicable inventive concepts that can be embodied in a wide variety of specific contexts. The specific examples discussed are merely illustrative of specific ways to make and use the invention, and do not limit the scope of the invention. Throughout the discussion herein, unless otherwise specified, the same or similar numerals in different figures refer to the same or similar component.

The present disclosure will be described with respect to examples in a specific context, namely frequency response characterization for radio frequency integrated circuits (RFICs) with multiple parallel receiving channels. One skilled in the art will readily appreciate that the principles disclosed herein may also be used for characterizing other analog circuits with multiple parallel processing channels.

Figure 1:
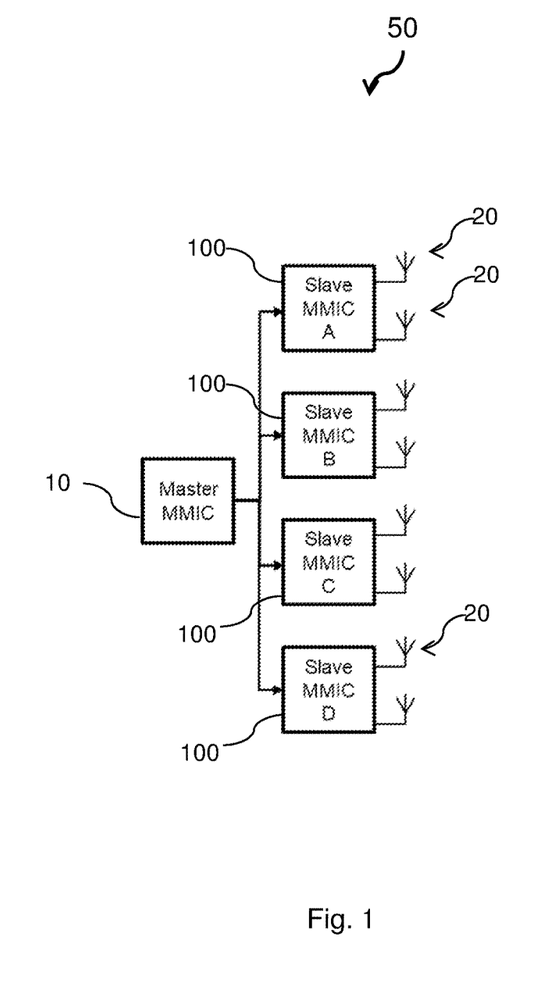
FIG. 1 illustrates a block diagram of a radar system, in an embodiment.

FIG. 1 illustrates a block diagram of a radar system 50, in an embodiment. The radar system 50 has a plurality of RFICs 100. The RFIC 100 may be, e.g., a monolithic microwave integrated circuits (MMICs). Each of the RFICs 100 has multiple receiving channels, where each receiving channel is configured to receive a radio frequency (RF) signal from an external antenna 20 during normal operation. In the illustrated embodiment, the multiple receiving channels within each RFIC 100 work in parallel, and the plurality of RFICs 100 work in parallel. Therefore, the radar system 50 is able to process RF signals from K1×K2 number of external antennas 20, where K1 is the number of RFICs 100 in the radar system 50, and K2 is the number of receiving channels in each RFIC 100. Note that the number of RFICs 100 and the number of receiving channels illustrated in FIG. 1 are merely non-limiting examples, other numbers are also possible and are fully intended to be included within the scope of the present disclosure.

FIG. 1 further illustrates an integrated circuit (IC) 10, which is coupled to all of the RFICs 100. In the illustrated embodiment, the IC 10 serves as a master (may also be referred to as a master MMIC) in the radar system, and the plurality of RFICs 100 serve as slaves (may also be referred to as slave MMICs) in the radar system. The IC 10 is configured to control the plurality of RFICs 100. For example, the IC 10 may include a local oscillator (LO) circuit for generating a reference sinusoidal signal, which is supplied to the RFICs 100 and used by, e.g., the mixers in the RFICs 100.

Figure 2:
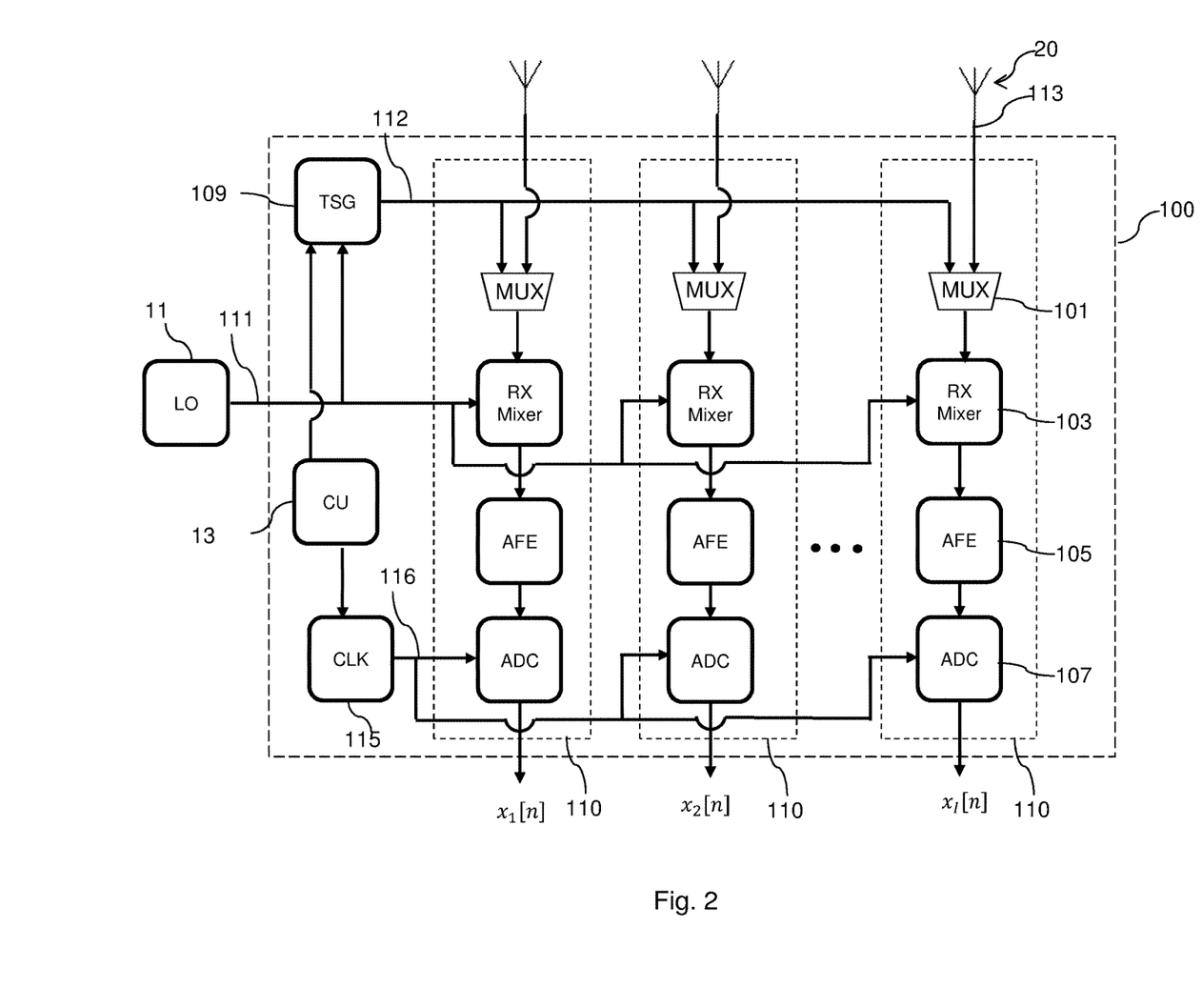
FIG. 2 illustrates a block diagram of a radio frequency integrated circuit (RFIC), in an embodiment.

FIG. 2 illustrates a block diagram of the RFIC 100 of FIG. 1, in an embodiment. Note that FIG. 2 also illustrates a local oscillator (LO) circuit 11 and antennas 20 to show the electrical connections of the RFIC 100. The LO circuit 11 (which may be a circuit within the IC 10 in FIG. 1) and the antennas 20, however, are not part of the RFIC 100, in the illustrated embodiment.

As illustrated in FIG. 2, the RFIC 100 has a plurality of receiving channels no, a test signal generator (TSG) 109, a control unit 13, and a clock circuit 115. The control unit 13 may generate a trigger signal that is used to stat the analog-to-digital converters (ADCs) 107 in the plurality of receiving channels no. The trigger signal may also be used as a synchronization signal to start the TSG 109 and the ADCs 107 of the RFICs 100 at the same time, details of which are discussed hereinafter. The control unit 13 may be, e.g., a digital core integrated in the RFIC 100, such as a micro controller, a digital signal processor (DSP), a central processing unit (CPU), or the like. Each of the receiving channels no includes a mixer 103, an analog front end (AFE) filter 105 coupled to the mixer 103, and an analog-to-digital converter (ADC) 107 coupled to the AFE filter 105. FIG. 2 further illustrates a multiplexer (MUX) 101 in each receiving channel 110. In the example of FIG. 2, a first input of the MUX 101 is coupled to an output of the TSG 109, and a second input of the MUX 101 is coupled to a respective external antenna 20. The output of the MUX 101 is coupled to the input of the mixer 103.

In some embodiments, the mixer 103 has a normal operation mode and a calibration mode. In the normal operation mode of the mixer 103, the MUX 101 is controlled by a user setting (e.g., through a setting in a control register of the RFIC 100) such that the RF signal from the external antenna 20 is sent to the mixer 103. In the calibration mode of the mixer 103, the MUX 101 is controlled by the user setting such that the output of the TSG 109 is send to the mixer 103.

The TSG 109 is configured to generate a sinusoidal signal 112 based on an LO signal (e.g., generated by the LO circuit 11) received at an input terminal 111 of the RFIC 100. In the discussion herein, a sinusoidal signal is also referred to as a tone signal, or simply a tone. The frequency of the sinusoidal signal 112 is user-controllable, e.g., by setting one or more control registers of the RFIC 100. In some embodiments, the LO signal is a sinusoidal signal having an angular frequency of $\omega_c$, the TSG 109 generates a sinusoidal signal 112 having an angular frequency of $\omega_c + \omega_t$, such that during the calibration mode of the mixer 103, the mixer 103 mixes the LO signal with the sinusoidal signal 112 to output a test tone having an angular frequency of $\omega_t$, or equivalently, a frequency of $f_t = \omega_t / 2\pi$.

In the illustrated embodiments, the frequency $f_t$ of the test tone is selected to be within a frequency band of the AFE filter 105, in order to characterize (e.g., probe) the frequency response of the AFE filter 105 at the frequency $f_t$, details of which are discussed hereinafter. For example, if the AFE filter 105 has a pass-band between $\tilde{f}_1=\omega_1/2\pi$ and $\tilde{f}_2=\omega_2/2\pi$, then the frequency $f_t$ of the test tone is selected to be $f_1 \leq f_t \leq f_2$, where $f_1=\tilde{f}_1-\Delta_{f1}$, $f_2=\tilde{f}_2+\Delta_{f2}$, $\Delta_{f1} \geq 0$, and $\Delta_{f2} \geq 0$. Note that by choosing $\Delta_{f1}$ and $\Delta_{f2}$ to be positive frequency values, the test frequency band between $f_1$ and $f_2$ (referred to as the frequency band of the AFE filter 105) includes the pass-band of the AFE filter 105, and additionally, includes some margins on both ends to cover additional frequency bands (e.g., pre-determined frequency band $\Delta_{f1}$ and $\Delta_{f2}$) adjacent to the pass-band of the AFE filter 105. This may be useful to determine, e.g., the actual cut-off frequencies of the AFE filter 105, which may be different from what the nominal value of the pass-band of the AFE filter 105 would suggest.

In some embodiments, in the calibration mode of the mixer 103, the TSG 109 directly generates a test tone having the frequency $f_t$ for probing the frequency response of the AFE filter 105, and the mixer 103 passes through the test tone to the AFE filter 105. In other words, the output of the TSG 109, which is a test tone having the frequency $f_t$, is sent directly to the AFE filter 105 at the output of the mixer 103.

Still referring to FIG. 2, the AFE filter 105 in each receiving channel no has a normal operation mode and a bypass mode. In the normal operation mode, the AFE filter 105 is enabled (e.g., turned on), such that the output of the mixer 103 is filtered by the AFE filter 105, and the filtered output of the mixer 103 is sent to the output terminal of the AFE filter 105. In the bypass mode, the AFE filter 105 is bypassed such that the output of the mixer 103 is passed through to the ADC 107. In other words, in the bypass mode, the output of the mixer 103 is sent to the output terminal of the AFE filter 105. The ADC 107 in each receiving channel no samples the output signal at the output terminal of the AFE filter 105 and converts the output signal at the output terminal of the AFE filter 105 into digital samples for processing. Note that depending on the mode (e.g., calibration mode or normal operation mode) of the mixer 103 and the mode (e.g., bypass mode or normal operation mode) of the AFE filter 105, the output signal at the output terminal of the AFE filter 105 may be the RF signal from the external antenna 20 (down-converted by the mixer 103 and filtered by the AFE filter 105), or the test tone with frequency $f_t$ (unfiltered or filtered by the AFE filter 105).

FIG. 2 further illustrates a clock circuit 115, which is configured to generate a clock signal 116 (e.g., a sampling clock) to drive the ADCs 107 of the RFIC 100. In the illustrated embodiment, the ADCs 107 in the receiving channels no are driven by the same clock signal 116, thus are synchronized with each other. In some embodiments, the clock circuit 115 is omitted, the clock signal 116 is generated by an external clock circuit (which may be part of the IC 10 in FIG. 1) and is received at an input terminal of the RFIC 100.

The plurality of RFICs 100 in the radar system 50 may be coupled to an antenna array for angle-of-arrive (AoA) applications. In radar applications, the frequency response of the AFE filter 105 is important for the system performance. For instance, in AoA applications, to achieve good target identification/separation performance, a phase coherence of less than about 3 degrees may be needed between the frequency responses of the AFE filters 105. Although the receiving channels no in the RFIC 100 may be designed to be identical in product specifications, the actual frequency responses of the AFE filters 105 in the receiving channels no may be different from each other, due to various factors, such as process variations during manufacturing, temperature induced parameter shift, and/or component aging. Since the AFE filters 105 are often high-order filters (e.g., 6-th order Nyquist filters), small variations in the corner frequency of the AFE filters 105 may result in large difference in the phase responses of the AFE filters. Mismatch in the frequency response of the AFE filters 105 may cause issues in radar system performance, such as ghost targets, and inability to separate different targets.

In order to compensate for the variations in the frequency responses of the AFE filters 105, a calibration process may be performed to characterize the frequency response of each of the AFE filters 105. Once the frequency responses of the AFE filters 105 are known, the differences in the phase responses and/or the frequency responses of the AFE filters 105 can be compensated in digital domain by signal processing algorithms. For example, the digital samples at the output of each ADC 107 may be filtered by a respective digital filter implemented in the signal processing algorithm. By designing each digital filter in accordance with the frequency response of the respective AFE filter 105, the combined frequency response of the digital filter and the AFE filter 105 for each receiving channel 110 could be made uniform (e.g., match each other), which results in improved system performance for the radar system.

Conventionally, the AFE filters 105 may be calibrated by end-of-line (EoL) calibration methods at the factory using over-the-air measurements via expensive Radar Target Simulator, which is timing consuming and costly. In addition, such EoL methods may not be applicable once the RFIC 100 is deployed in the field. The present disclosure discloses example calibration methods that use the internal test signal generator (TSG) of the RFIC 100. The disclosed calibration methods allow for quick, easy, and low-cost calibration of the AFE filters 105, and can be used either at the factory during manufacturing or in the field. Therefore, the disclosed calibration method could be performed in the field periodically to get an updated estimate of the frequency responses of the AFE filters 105 to compensate for, e.g., temperature induced parameter drift and/or component aging.

Figure 3A:
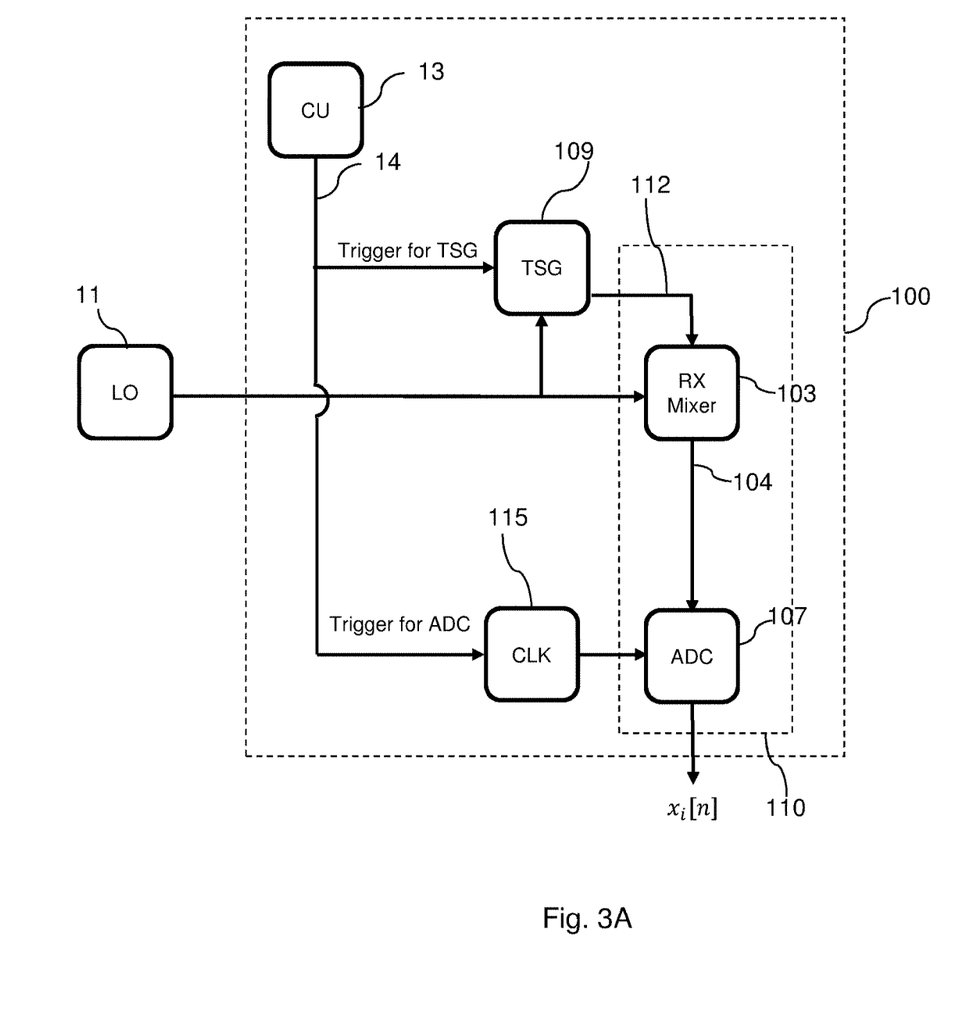
FIGS. 3A and 3B illustrate the equivalent block diagram of the RFIC of FIG. 2 during a first step and a second step of a calibration process, respectively, in an embodiment.
Figure 3B:
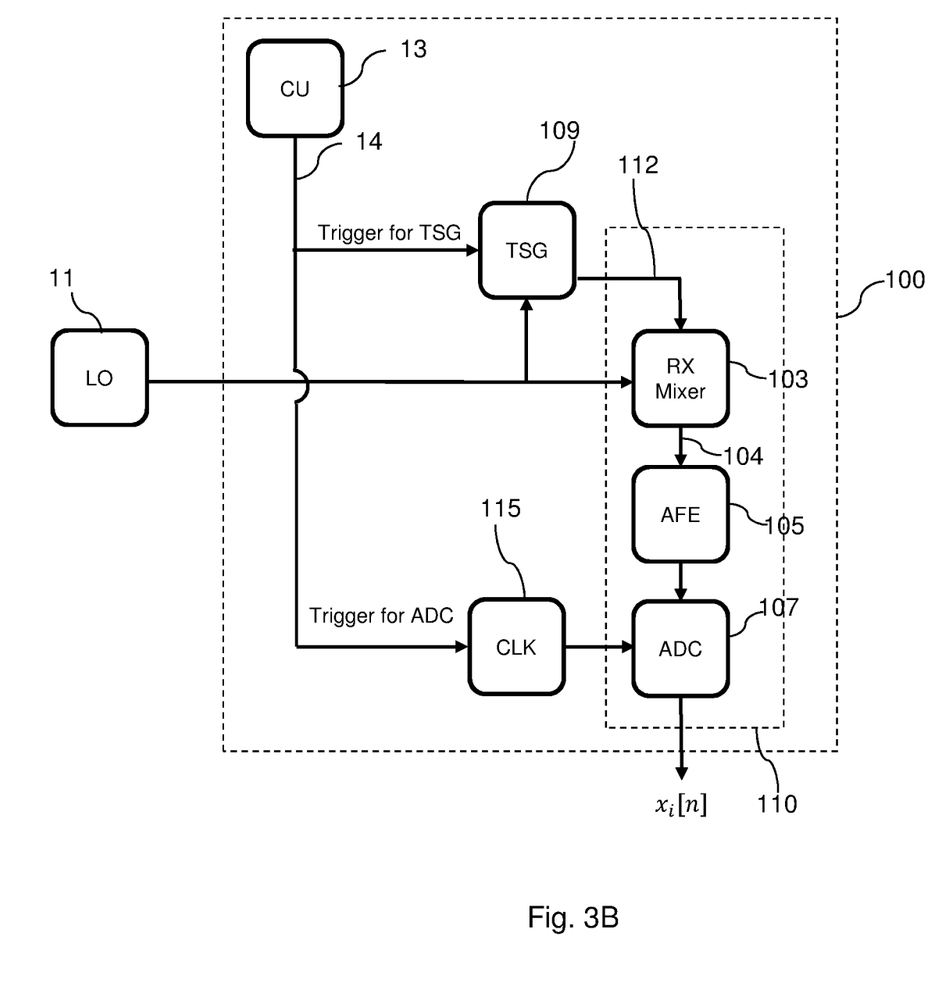

FIGS. 3A and 3B illustrate the equivalent block diagram of the RFIC 100 of FIG. 2 during a first step and a second step of a calibration process, respectively, in an embodiment. The calibration method of FIGS. 3A and 3B is applicable when the TSG 109 and the ADC 107 are synchronized. In the illustrated embodiment, the control unit 13 provides a trigger signal 14 to start the TSG 109 and the clock circuit 115 of the RFIC 100 at the same time. Since the clock circuit 115 drives the ADC 107, effectively the TSG 109 and the ADC 107 are started either at the same time or have a fixed timing offset in between, thus are synchronized. By synchronizing the TSG 109 with the ADC 107, the output of the ADC 107, which are digital samples of a test tone 104 (e.g., a sinusoidal signal) at the output of the mixer 103, has a fixed phase component due to the fixed timing offset between the TSG 109 and the ADC 107. The fixed phase component in the ADC output greatly simplifies the calibration process, and allows calibration of the AFE filter 105 in each receiving channel no using ADC data from that receiving channel no only, as discussed below. Therefore, FIGS. 3A and 3B only illustrate one receiving channel no (e.g., the receiving channel having the AFE filter 105 that is being calibrated).

The calibration method for characterizing the AFE filter 105 in the i-th receiving channel no is described below with reference to FIGS. 3A and 3B, where i is an integer from 1 to I, and I is the total number of receiving channels no in the RFIC 100. Note that for simplicity, in FIGS. 3A and 3B, only the i-th receiving channel no is shown. The LO circuit 11 is not part of the RFIC 100, but is shown in FIGS. 3A and 3B to illustrate the connections between the RFIC 100 and external circuits/components during the calibration process.

Referring to FIG. 3A, during the first step of the calibration process, the mixer 103 is set to the calibration mode and the AFE filter 105 is set to the bypass mode. Therefore, the sinusoidal signal 112 at the output of the TSG 109 is mixed with the LO signal from the LO circuit 11 by the mixer 103 to generate the test tone 104 with a frequency $f_t = \omega_t/2\pi$, where $f_1 \leq f_t \leq f_2$, and where $f_1$ and $f_2$ are the lower frequency and the upper frequency of the frequency band of the AFE filter 105. Note that the AFE filter 105 is bypassed in the first step, thus not shown in FIG. 3A.

The test tone 104 in the i-th receiving channel no during the first step of calibration process is converted into digital samples $x_{1,i}(n)$ by the ADC 107, where n=1, 2, . . . , N. The number of digital samples N may be any suitable number, such as 1024, 2048, or the like. One skilled in the art will readily appreciate that the digital samples $x_{1,i}(n)$ in the i-th receiving channel 110 at the first step of the calibration process can be represented as:

$$x_{1,i}(n) = A_{TSG,i} \cos(\omega_t n + \phi_{RF,i} + \Psi_{TSG}) \quad (1)$$

where $A_{TSG,i}$ is the amplitude of the test tone 104 in the i-th channel, $\phi_{RF,i}$ is an unknown deterministic phase in the i-th channel (e.g., caused by the phase difference between the RF signals at the input terminals of the mixer 103), and $\Psi_{TSG}$ is a constant phase (e.g., caused by the fixed timing offset between the TSG and the ADC). Note that due to the synchronization of the TSG 109 and the ADC 107 (thus fixed timing offset between TSG and ADC), $\Psi_{TSG}$ may have a known value, or an unknown but fixed value.

The digital samples $x_{1,i}(n)$ of equation (i) are used to compute a first frequency estimate of the i-th receiving channel 110 of the RFIC 100. In some embodiments, the digital samples $x_{1,i}(n)$ are processed by a pre-processing before computing the first frequency estimate. In an example, the pre-processing includes removing the direct current (DC) component from the digital samples $x_{1,i}(n)$, then apply a windowing function to the digital samples $x_{1,i}(n)$. Denote the digital samples $x_{1,i}(n)$ as a N×1 vector $X_i = [x_{1,i}(1), x_{1,i}(2), \ldots, x_{1,i}(N)]^T$, the pre-processing can be described as:

$$X_{win,i} = (X_i - \text{mean}(X_i)) \odot V_{win} \quad (2)$$

where T denotes the vector transpose operation, and the mean(·) function calculates a mean of the vector $X_i$ (e.g., the average value of the elements in the vector $X_i$). The average value is subtracted from the vector $X_i$ to remove the DC component. The vector $V_{win}$ is a vector of the same size as $X_i$, and the elements of the vector $V_{win}$ correspond to a windowing function, such as a Hamming window, a Blackman window, or the like. The various windowing functions are well-known in signal processing, thus details are not repeated. The operator ⊙ represents dot product, which is an element-wise multiplication between two vectors. The vector $X_{win,i}$ represents the pre-processed digital samples in the i-th receiving channel no.

Next, the pre-processed digital samples in the vector $X_{win,i}$ are down-shifted to base band by multiplying with a complex tone, and therefore, the down-shifted digital samples have complex values. In some embodiments, the complex tone is a complex sinusoidal signal, which is represented by $e^{j\omega_t t} = e^{j2\pi f_t t}$. Define a vector $V_N$ having dimension of N×1 as $$V_N = \left[ -\frac{N}{2}, -\frac{N}{2}+1, \ldots, -1, 0, 1, \ldots, \frac{N}{2}-1 \right]^T,$$

then a sequence of N digital samples of the complex tone may be represented by a N×1 vector $V_{ctone}$ by:

$$V_{ctone} = \exp\left( j\left(\frac{2\pi f_t}{f_s}\right) \cdot V_N \right) \quad (3)$$

where $f_s$ is the sampling frequency of the ADC 107, and N is an even number. The down-shifted digital samples may be computed by performing an element-wise multiplication between the vector $X_{win,i}$ and the vector $V_{ctone}$ (e.g., $X_{win,i} \odot V_{ctone}$). Next, a sum of the down-shifted digital samples is computed to obtain a complex number $x_{clx,i}$ for the i-th receiving channel 110. The sum operation on the down-shifted digital samples functions as a low pass filter to filter out high frequency components (e.g., frequency components at the frequency $2 f_t$). In addition, the sum operation, which generates a scaled version of the mean value of the down-shifted digital samples, averages out random noises in the digital samples to achieve better estimation results. The above processing to compute the complex number $x_{clx,i}$ can be concisely represented by:

$$X_{clx,i} = X_{win,i}^T * V_{ctone} \quad (4)$$

where the operator * represents vector multiplication. The complex value $x_{clx,i}$ is used to calculate the first frequency estimate of the i-th receiving channel no, which includes a first amplitude estimate $A_{1,i}$ and a first phase estimate $Ø_{1,i}$. In the illustrated embodiment, the first amplitude estimate $A_{1,i}$ and the first phase estimate $Ø_{1,i}$ for the i-th receiving channel no are the amplitude and the phase of the complex value $x_{clx,i}$, respectively, and may be computed using Equations (5) and (6) below as:

$$\text{amplitude} = \sqrt{(\text{real}(x_{clx,i}))^2 + (\text{imag}(x_{clx,i}))^2} \quad (5)$$

$$\text{phase} = \text{atan2}[\text{imag}(x_{clx,i}), \text{real}(x_{clx,i})] \quad (6)$$

where the real(·) function and the imag(·) function return the real part and the imaginary part of the complex value, respectively, and the atan2(·) function is the four-quadrant arctangent function that returns an angle between 0 and $2\pi$. The first amplitude estimate $A_{1,i}$ is thus an estimate (or a scaled version of the estimate, scaled by N) of the amplitude $A_{TSG,i}$ in Equation (1), and the first phase estimate $Ø_{1,i}$ is an estimate of the phase $\phi_{RF,i} + \Psi_{TSG}$ in Equation (1).

Referring now to FIG. 3B, which illustrates the second step of the calibration process. In the second step of the calibration process, the mixer 103 is still in the calibration mode and generates a test tone 104 with frequency $f_t$ at its output. In contrast to the first step of calibration process, the AFE filter 105 is now set in the normal operation mode. In other words, the AFE filter 105 is turned on (also referred to as being enabled), so that the test tone 104 from the mixer 103 is filtered by the AFE filter 105. The ADC 107 converts the output of the AFE filter 105 (which is the filtered test tone 104) into N digital samples $x_{2,i}(n)$, n=1, 2, . . . , N, for calculation of a second frequency estimate for the i-th receiving channel no of the RFIC 100. Note that in the second step of the calibration process, the TSG 109 and the ADC 107 are still synchronized.

The digital samples $x_{2,i}(n)$ from the i-th receiving channel no at the second step of the calibration process can be represented as:

$$x_{2,i}(n)=A_i(\omega_t)A_{TSG,i}\cos(\omega_t n+\phi_{RF,i}+\phi_i(\omega_t)+\Psi_{TSG}) \quad (7)$$

where $A_i(\omega_t)$ and $\phi_i(\omega_t)$ are the amplitude response and the phase response, respectively, of the AFE filter 105 in the i-th receiving channel no at the test tone angular frequency $\omega_t$. Comparing Equation (7) with Equation (1), it is seen that the amplitude response and the phase response of the AFE filter 105 modify the amplitude and the phase of the digital samples $x_{2,i}(n)$ by a corresponding amount. Note that the amplitude $A_{TSG,i}$, the phase $\phi_{RF,i}$, and the phase $\Psi_{TSG}$ are the same in Equations (1) and (7).

The processing discussed above may be performed again using the digital samples $x_{2,i}(n)$ to generate a second frequency estimate for the i-th receiving channel no. In particular, by denoting the digital samples $x_{2,i}(n)$ as the N×1 vector $X_i=[x_{2,i}(1), x_{2,i}(2), \ldots, x_{2,i}(N)]^T$, the processing of Equations (2)-(6) is performed to form a second amplitude estimate $A_{2,i}$ and a second phase estimate $\varnothing_{2,i}$, where the second amplitude estimate $A_{2,i}$ is an estimate of the amplitude $A_i(\omega_t)A_{TSG,i}$ in Equation (7), and the second phase estimate $\varnothing_{2,i}$ is an estimate of the phase $\phi_{RF,i}+\phi_i(\omega_t)+\Psi_{TSG}$ in Equation (7).

Next, an estimate of the amplitude response $A_i(\omega_t)$ of the AFE filter 105 in the i-th receiving channel no at the angular frequency $\omega_t$ (or frequency $f_t=\omega_t/2\pi$) is calculated by:

$$A_i(\omega_t)=A_{2,i}/A_{1,i} \quad (8)$$

In addition, an estimate of the phase response $\phi_i(\omega_t)$ of the AFE filter 105 in the i-th receiving channel 110 at the angular frequency $\omega_t$ (or frequency $f_t=\omega_t/2\pi$) is calculated by:

$$\phi_i(\omega_t)=\varnothing_{2,i}-\varnothing_{1,i} \quad (9)$$

Note that due to the synchronization of the TSG 109 and the ADC 107, the phase $\Psi_{TSG}$ has a fixed value and is the same in Equations (1) and (7). This allows this unknown phase $\Psi_{TSG}$ (and the fixed phase $\phi_{RF,i}$) to be cancelled out in the subtraction operation of Equation (9). In embodiments where the TSG 109 and the ADC 107 are un-synchronized (e.g., no trigger signal to start the TSG 109 and the ADC 107 at the same time, thus having a random timing offset between the start of the TSG 109 and the start of the ADC 107), the phase $\Psi_{TSG}$ in Equations (1) and (7) are two different random values and could not be cancelled out using the operation of Equation (9). For un-synchronized TSG 109 and ADC 107, one or more reference receiving channels no are used to cancel out the random phase values $\Psi_{TSG}$, as discussed below with reference to FIGS. 4A and 4B.

After the frequency response of the AFE filter 105 at the frequency $f_t$ is calibrated, the same processing discussed above can be repeated for another frequency within the frequency band of the AFE filter 105. In other words, the frequency $f_t$ can be chosen to sweep across the frequency band of the AFE filter 105 to get the frequency response of the AFE filter 105 at different frequencies within the frequency band.

Figure 4A:
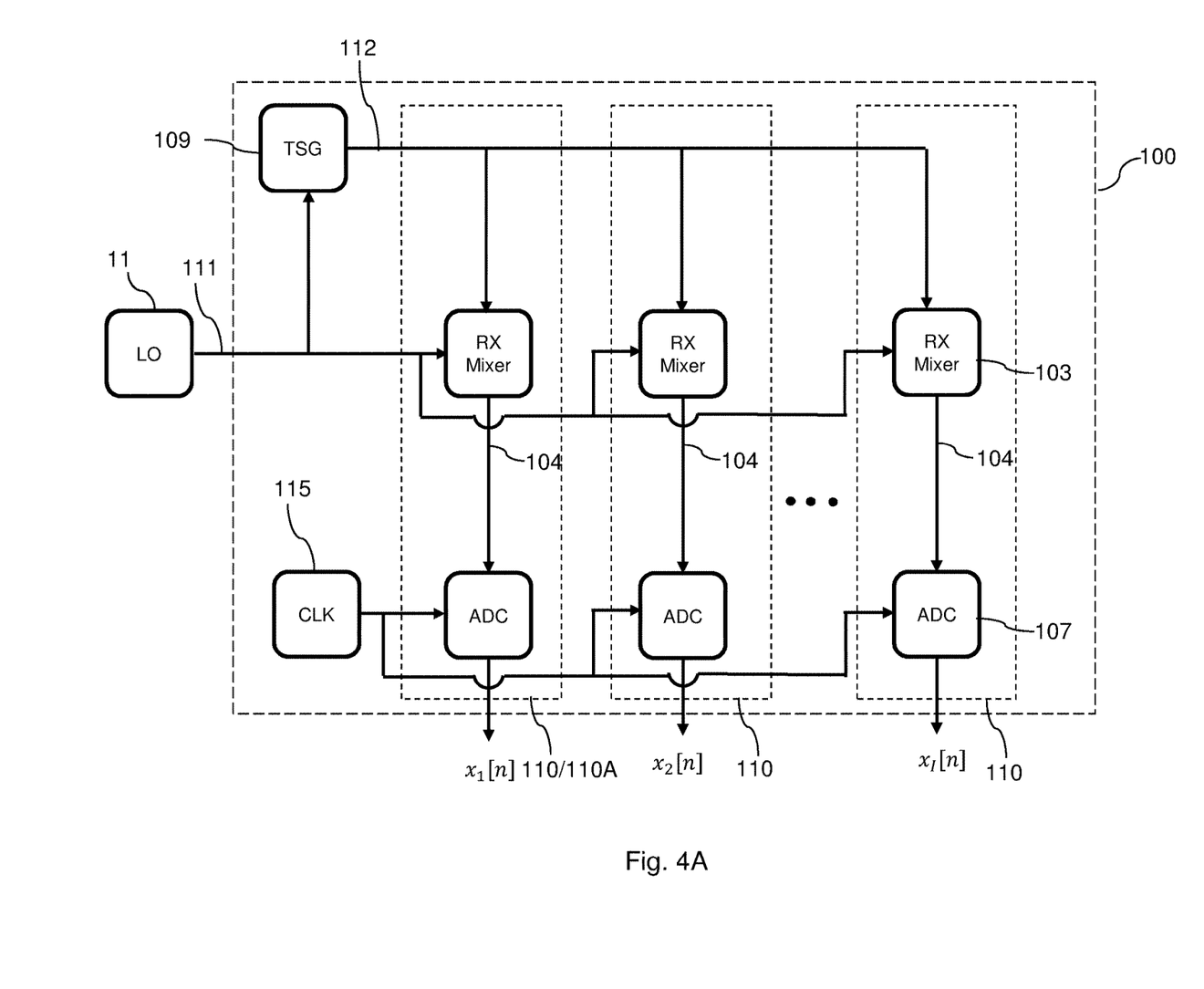
FIGS. 4A and 4B illustrate the equivalent block diagram of the RFIC of FIG. 2 during a first step and a second step of a calibration process, respectively, in another embodiment.
Figure 4B:
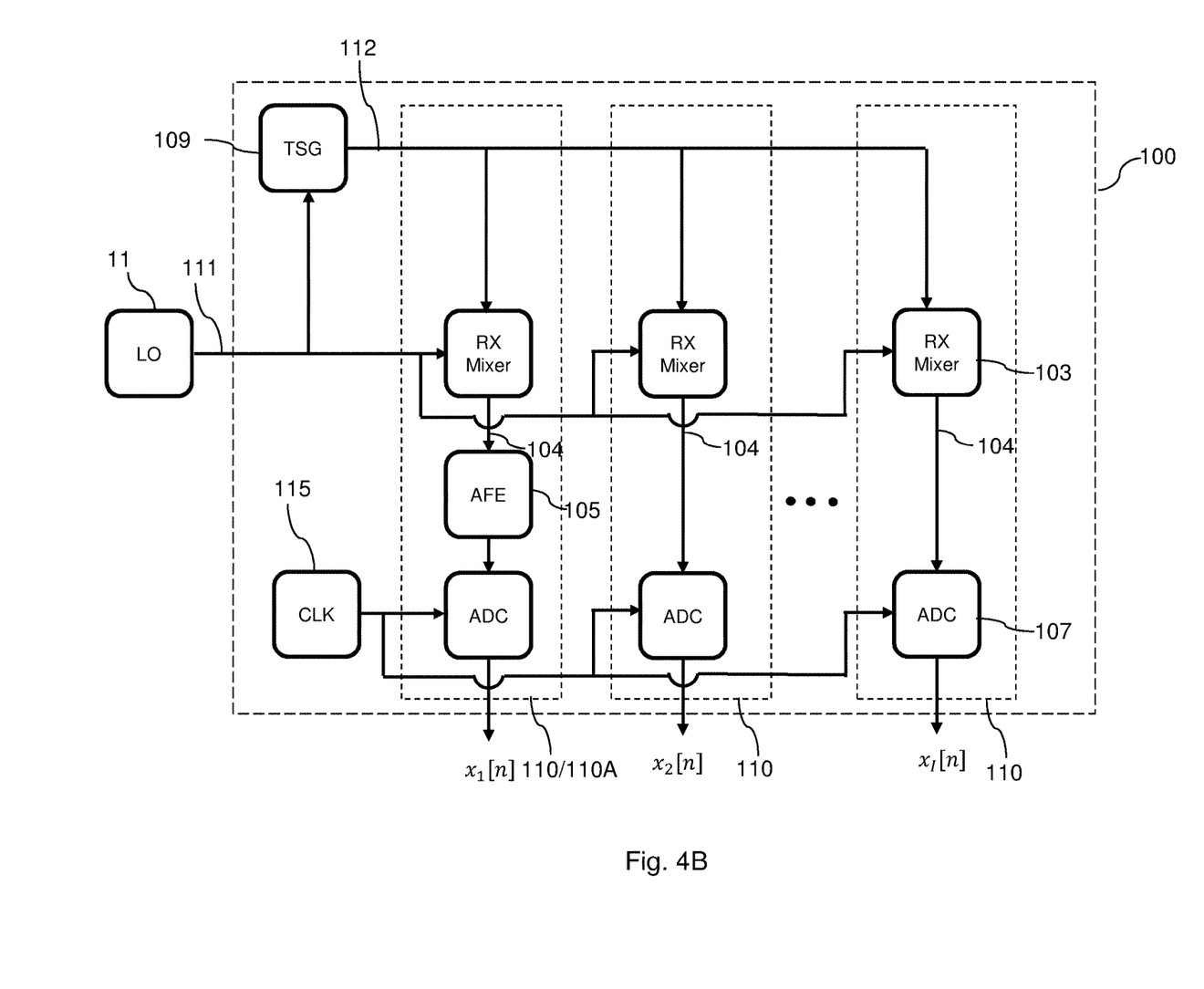

FIGS. 4A and 4B illustrate the equivalent block diagram of the RFIC 100 of FIG. 2 during a first step and a second step of a calibration process, respectively, in another embodiment. The LO circuit 11 in FIGS. 4A and 4B is not part of the RFIC 100, but is shown to illustrate the connections between the RFIC 100 and external circuits/components during the calibration process. The calibration process of FIGS. 4A and 4B is suitable for applications where the TSG 109 and the ADC 107 are un-synchronized. In other words, there is a random timing offset between the start of the TSG 109 and the start of the ADC 107. As a result of the random timing offset, the frequency estimate using the ADC output data includes a random phase component. To cancel out the random phase component, one or more receiving channels no (e.g., channels other than the receiving channel no being characterized) are used as reference channels, details are discussed below. Without loss of generality, in the discussion of the calibration method of FIGS. 4A and 4B, it is assumed that the frequency response of a first receiving channel 110A is being calibrated, and other receiving channels no in the RFIC 100 are used as reference channels.

Referring to FIG. 4A, at the first step of the calibration process, the mixers 103 in all of the receiving channels no are set in the calibration mode, and the AFE filters 105 in all of the receiving channels no are set in the bypass mode (thus not shown in FIG. 4A). The ADCs 107 are driven by the clock signal from the clock circuit 115 to convert the output of the mixers 103 into digital samples for processing. In particular, the ADC 107 in each receiving channel no converts the output of the respective mixer 103 into digital samples $x_{1,i}(n)$, where i=1, 2, . . . , I, n=1, 2, . . . , N, and where I is the number of receiving channels no in the RFIC 100, and N is the number of digital samples captured by the ADC 107 in each receiving channel 110.

Note that in the discussion of the calibration processes of FIGS. 4A/4B and FIGS. 3A/3B, unless otherwise specified, the same mathematical notations and symbols are used to represent the same or similar entities/values, and therefore, certain details are not repeated here for brevity, which details can be found in the discussion above with reference to FIGS. 3A and 3B.

As illustrated in FIG. 4A, the sinusoidal signal 112 at the output of the TSG 109 is mixed with the LO signal from the LO circuit 11 by the mixer 103 in each receiving channel no to generate a test tone 104 with a frequency $f_t=\omega_t/2\pi$ in each receiving channel no, where $f_1 \le f_t \le f_2$, and where $f_1$ and $f_2$ are the lower frequency and the upper frequency of the frequency band of the AFE filter 105.

The test tone 104 in the i-th receiving channel no in the first step of the calibration process is converted into digital samples $x_{1,i}(n)$ by the ADC 107, where n=1, 2, . . . , N. One skilled in the art will readily appreciate that the digital samples $x_{1,i}(n)$ in the i-th receiving channel 110 at the first step of the calibration process can be represented as:

$$x_{1,i}(n)=A_{TSG,i}\cos(\omega_t n+\phi_{RF,i}+\Psi_{1,TSG}), \text{ for } i=1,2,\ldots,I \quad (10)$$

where $A_{TSG,i}$ is the amplitude of the test tone 104 in the i-th channel, $\phi_{RF,i}$ is an unknown deterministic phase in the i-th channel, and $\Psi_{1,TSG}$ is a random phase (e.g., caused by the random timing offset between the TSG and the ADC). Note that the random phase $\Psi_{1,TSG}$ is the same for all of the receiving channels 110.

The processing described above in Equations (2)-(6) may be performed for each set of digital samples $x_{1,i}(n)$ (e.g., the N digital samples from the i-th receiving channel 110) to obtain a first frequency estimate for each of the receiving channel 110s. For example, the first frequency estimate for the i-th receiving channel no includes a first amplitude estimate $A_{1,i}$ and a first phase estimate $\varnothing_{1,i}$. The first amplitude estimate $A_{1,i}$ is an estimate (or a scaled version of the estimate, scaled by N) of the amplitude $A_{TSG,i}$ in Equation (10), and the first phase estimate $\emptyset_{1,i}$ is an estimate of the phase $\phi_{RF,i}+\Psi_{1,TSG}$ in Equation (10).

Referring now to FIG. 4B, in the second step of the calibration process, the mixers 103 are still in the calibration mode, and each mixer 103 generates a test tone 104 with frequency $f_t$ in a respective receiving channel 110. In contrast to the first step of calibration process, the AFE filter 105 in the first receiving channel 110A is now set in the normal operation mode, while the AFE filters 105 in other receiving channels no of the RFIC 100 are still in the bypass mode. In other words, the AFE filter 105 in the first receiving channel 110A is turned on to filter the test tone 104 from the mixer 103 in the first receiving channel 110A, while the test tones 104 in other receiving channels no are not filtered by the AFE filters 105. The output of the AFE filter 105 in the first receiving channel no is converted into digital samples $x_{2,1}(n)$, and the test tones 104 in other receiving channels no are each converted into a plurality of digital samples $x_{2,i}(n)$, i=2, 3, . . . , I. Note that in the second step of the calibration process, the TSG 109 and the ADC 107 are also un-synchronized.

The digital samples $x_{2,1}(n)$, n=1, 2, . . . , N, from the first receiving channel 110A at the second step of the calibration process can be represented as:

$$x_{2,1}(n)=A_1(\omega_t)A_{TSG,1}\cos(\omega_t n+\phi_{RF,1}+\phi_1(\omega_t)+\Psi_{2,TSG}) \quad (11)$$

and the digital samples $x_{2,i}(n)$, i=2, 3, . . . , I, n=1, 2, . . . , N, from the other receiving channel 110 at the second step of the calibration process can be represented as:

$$x_{2,i}(n)=A_{TSG,i}\cos(\omega_t n+\phi_{RF,i}+\Psi_{2,TSG}) \text{ for } i=2,3,\ldots,I \quad (12)$$

where $A_1(\omega_t)$ and $\phi_1(\omega_t)$ are the amplitude response and the phase response, respectively, of the AFE filter 105 in the first receiving channel 110A at the test tone angular frequency $\omega_t$. Comparing Equation (11) with Equation (10), it is seen that the amplitude response and the phase response of the AFE filter 105 in the first receiving channel 110A modify the amplitude and the phase of the digital samples $x_{2,1}(n)$ by a corresponding amount. In addition, notice that since the AFE filters 105 in the other receiving channels 110 are bypassed in the second step of the fabrication process, Equation (12) is similar to Equation (11), but with unknown random phase $\Psi_{2,TSG}$.

The processing of Equations (2)-(6) is performed for each set of the digital samples $x_{2,i}(n)$ (e.g., the N digital samples from the i-th receiving channel 110) to form a second amplitude estimate $A_{2,i}$ and a second phase estimate $\emptyset_{2,i}$ for the AFE filter 105 in the i-th receiving channel. The second amplitude estimate $A_{2,1}$ for the first receiving channel 110A is an estimate of the amplitude $A_1(\omega_t)A_{TSG,1}$ in Equation (10), and the second phase estimate $\emptyset_{2,1}$ for the first receiving channel 110A is an estimate of the phase $\phi_{RF,1}+\phi_1(\omega_t)+\Psi_{2,TSG}$ in Equation (11). In contrast, the second amplitude estimate $A_{2,i}$, i=2, 3, . . . , or I, for each of the other receiving channels 110 (the reference channels) is an estimate of the amplitude $A_{TSG,i}$ in Equation (12), and the second phase estimate $\emptyset_{2,i}$, i=2, 3, . . . , or I, is an estimate of the phase $\phi_{RF,i}+\Psi_{2,TSG}$ in Equation (12).

The frequency response of the AFE filter 105 in the first receiving channel 110A is computed using the frequency estimates obtained in the first step and the second step of the calibration process. In particular, an estimate of the amplitude response $A_1(\omega_t)$ of the AFE filter 105 in the first receiving channel 110A at the angular frequency $\omega_t$ (or frequency $f_t=\omega_t/2\pi$) is calculated by:

$$A_1(\omega_t)=A_{2,1}/A_{1,1} \quad (13)$$

To calculate an estimate of the phase response $\phi_1(\omega_t)$ of the AFE filter 105 in the first receiving channel 110A at the angular frequency $\omega_t$ (or frequency $f_t=\omega_t/2\pi$), a phase adjustment value $\emptyset_{adj}$ is first calculated by:

$$\phi_{adj} = \frac{1}{I-1}\sum_{i=2}^{I}(\emptyset_{2,i}-\emptyset_{1,i}) \quad (14)$$

In Equation (14), each term in the summation (e.g., $\emptyset_{2,i}-\emptyset_{1,i}$) gives an estimate of $\Psi_{2,TSG}-\Psi_{1,TSG}$, and the estimates of $\Psi_{2,TSG}-\Psi_{1,TSG}$ from all reference channels are averaged to get a more accurate estimate of $\Psi_{2,TSG}-\Psi_{1,TSG}$. Next, the phase response $\phi_1(\omega_t)$ of the AFE filter 105 in the first receiving channel 110A at the angular frequency $\omega_t$ is calculated as:

$$\phi_1(\omega_t)=\emptyset_{2,1}-\emptyset_{1,1}-\emptyset_{adj} \quad (15)$$

Note that in Equation (15), the computation of $\emptyset_{2,1}-\emptyset_{1,1}$ results in an estimate of $\phi_1(\omega_t)+\Psi_{2,TSG}-\Psi_{1,TSG}$ The phase adjustment value $\emptyset_{adj}$, which is calculated using digital samples from the reference channels, provides an estimate of the random, unknown phase value $\Psi_{2,TSG}-\Psi_{1,TSG}$. Therefore, the phase adjustment value $\emptyset_{adj}$ is used in Equation (15) to cancel out the random, unknown phase value $\Psi_{2,TSG}-\Psi_{1,TSG}$ and to obtain the estimate of $\phi_1(\omega_t)$.

Equation (14) illustrates the concept of computing the average of the estimated phase values (e.g., $\emptyset_{2,i}-\emptyset_{1,i}$) from all reference channels. Note that during estimation of a phase of zero, a small amount of noise in the data may cause the atan2(·) function to return a phase estimate having a value near 0 or near $2\pi$, thus causing a discontinuity in the estimated phase values, which may cause errors when the phase estimates are used in an averaging operation. For example, the average of a first phase estimate of 0 and a second phase estimate of $2\pi$, while both phase estimates refer to the same angle of zero, results in an average of $\pi$. A variation of Equation (14) for computing the phase adjustment value $\emptyset_{adj}$ is given below, which has the advantage of avoiding the phase discontinuity issue described above:

$$\phi_{adj} = \text{angle}\left(\frac{1}{I-1}\sum_{i=2}^{I}e^{j(\emptyset_{2,i}-\emptyset_{1,i})}\right) \quad (16)$$

where the angle(·) function returns the angle of a complex number based on its real part and its imaginary part.

After the frequency response of the AFE filter 105 at the frequency $f_t$ is calibrated, the same processing discussed above can be repeated for another frequency within the frequency band of the AFE filter 105. In other words, the frequency $f_t$ can be chosen to sweep across the frequency band of the AFE filter 105 to get the frequency response of the AFE filter 105 at different frequencies with the frequency band.

Although the calibration process of FIGS. 4A and 4B are discussed for RFIC 100 with un-synchronized TSG and ADC, one skilled in the art will readily appreciate that the calibration process of FIGS. 4A and 4B also works for RFIC 100 with synchronized TSG and ADC, in which case the expected value of the phase adjustment value $\emptyset_{adj}$ is zero (e.g., $E(\emptyset_{adj})=0$). In addition, note that the calculation of the phase adjustment value $\emptyset_{adj}$ only uses the phase estimates of the reference channels, and therefore, the amplitude estimates $A_{2,i}$ (i=2, 3, . . . , or I) of the references channels may be omitted to save computational resource.

Variations to the disclosed embodiments are possible and are fully intended to be included within the scope of the present disclosure. For example, in the discussion above, digital samples from all of the reference channels are used to calculate phase estimates for all of the reference channels, which phase estimates are then used to calculate the phase adjustment value $Ø_{adj}$ in Equation (14). In other words, each term $Ø_{2,i}-Ø_{1,i}$ in Equation (14) offers an estimate of the phase adjustment value, which may be less accurate than the average of the estimates from all reference channels. One skilled in the art will readily appreciate that in applications where computations resource is limited, one can use a subset of the reference channels to compute the phase adjustment value $Ø_{adj}$. For example, one can use only a second receiving channel no to compute the phase adjustment value $Ø_{adj}$, albeit with less accuracy.

Figure 5:
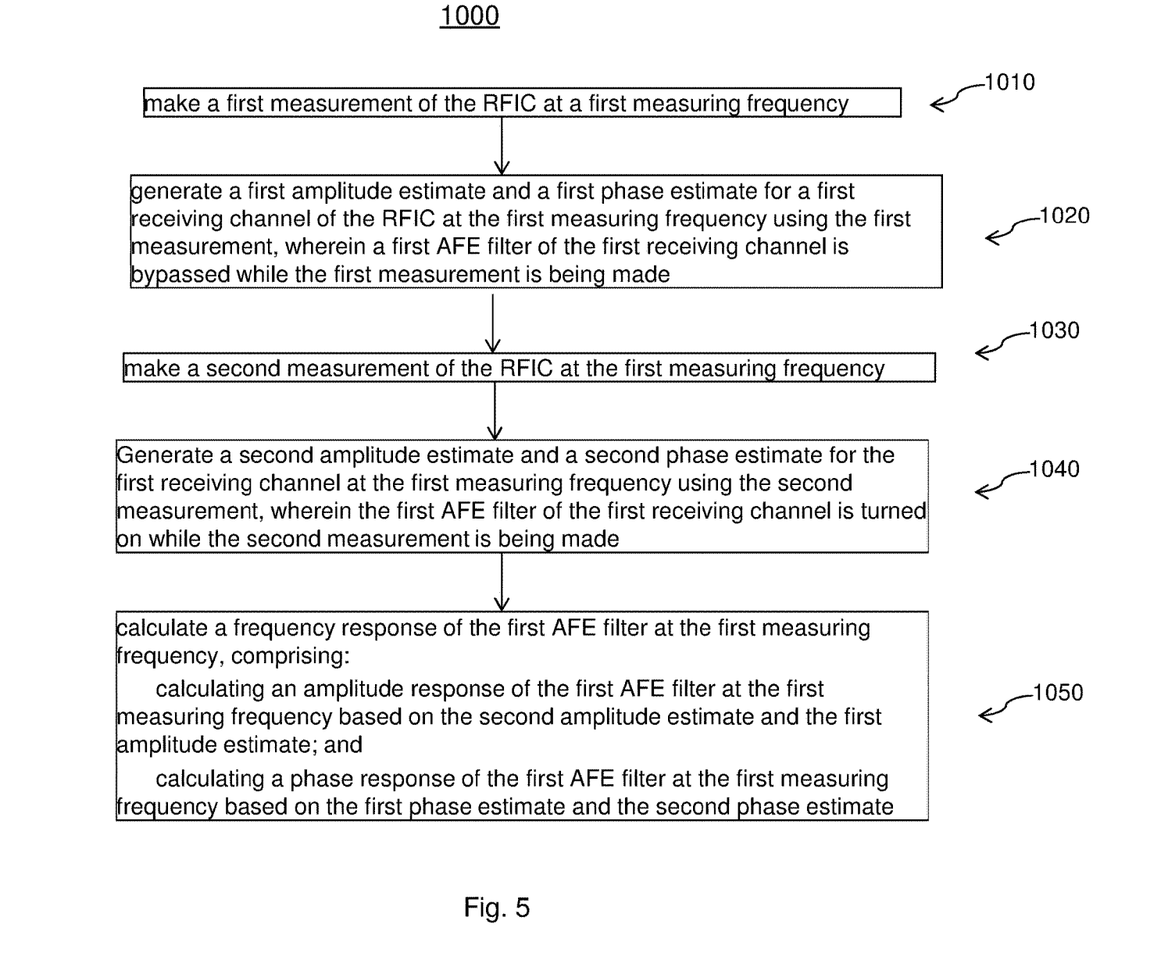
FIG. 5 illustrates a flow chart of a method for calibrating a radio frequency integrated circuit (RFIC), in some embodiments.

FIG. 5 illustrates a flow chart of an embodiment method 1000 of calibrating a radio frequency integrated circuit (RFIC) having multiple receiving channels, where each of the receiving channels has a mixer, an analog front end (AFE) filter coupled to the mixer, and an analog-to-digital converter (ADC) coupled to the AFE filter. It should be understood that the example method shown in FIG. 5 is merely an example of many possible example methods. One of ordinary skill in the art would recognize many variations, alternatives, and modifications. For example, various steps as illustrated in FIG. 5 may be added, removed, replaced, rearranged, or repeated.

Referring to FIG. 5, at block 1010, a first measurement of the RFIC is made at a first measuring frequency. At block 1020, a first amplitude estimate and a first phase estimate are generated for a first receiving channel of the RFIC at the first measuring frequency using the first measurement, wherein a first AFE filter of the first receiving channel is bypassed while the first measurement is being made. At block 1030, a second measurement of the RFIC is made at the first measuring frequency. At block 1040, a second amplitude estimate and a second phase estimate are generated for the first receiving channel at the first measuring frequency using the second measurement, wherein the first AFE filter of the first receiving channel is turned on while the second measurement is being made. At block 1050, a frequency response of the first AFE filter at the first measuring frequency is calculated by: calculating an amplitude response of the first AFE filter at the first measuring frequency based on the second amplitude estimate and the first amplitude estimate; and calculating a phase response of the first AFE filter at the first measuring frequency based on the first phase estimate and the second phase estimate.

Examples may achieve advantages. For example, the disclosed calibration methods allows easy, quick, and cost-effective calibration of the AFE filters 105 of the RFIC 100, either at the factory or in the field. The frequency response of the AFE filters obtained from the calibration process can be used in signal processing algorithms to compensate for the frequency response differences between the AFE filters 105 in different receiving channels 110, which in turn results in improved radar system performance. The disclosed calibration methods can be run periodically, after the RFIC 100 has been deployed in the field, to compensate for temperature induced parameter drifting and/or component aging, thus allowing for consistent system performance over time. The calibration method of FIGS. 3A and 3B provides a simple method suitable for systems with synchronized TSG and ADC, whereas the calibration method of FIGS. 4A and 4B provides a generic method that works for both synchronized or un-synchronized TSG and ADC. The disclosed methods have been tested using RFIC devices, and excellent accuracy of frequency response has been achieved. For example, an error of less than 0.5 degree has been achieved for the estimated phase response of the AFE filters 105.

Examples of the present invention are summarized here. Other examples can also be understood from the entirety of the specification and the claims filed herein.

Example 1. In an example, a method of calibrating a radio frequency integrated circuit (RFIC) having multiple receiving channels is disclosed, wherein each of the receiving channels has a mixer, an analog front end (AFE) filter coupled to the mixer, and an analog-to-digital converter (ADC) coupled to the AFE filter, wherein the method comprises: making a first measurement of the RFIC at a first measuring frequency; generating a first amplitude estimate and a first phase estimate for a first receiving channel of the RFIC at the first measuring frequency using the first measurement, wherein a first AFE filter of the first receiving channel is bypassed while the first measurement is being made; making a second measurement of the RFIC at the first measuring frequency; generating a second amplitude estimate and a second phase estimate for the first receiving channel at the first measuring frequency using the second measurement, wherein the first AFE filter of the first receiving channel is turned on while the second measurement is being made; and calculating a frequency response of the first AFE filter at the first measuring frequency, comprising: calculating an amplitude response of the first AFE filter at the first measuring frequency based on the second amplitude estimate and the first amplitude estimate; and calculating a phase response of the first AFE filter at the first measuring frequency based on the first phase estimate and the second phase estimate.

Example 2. The method of example 1, further comprising determining a phase adjustment value between the second measurement and the first measurement, wherein calculating the amplitude response comprises dividing the second amplitude estimate by the first amplitude estimate, and wherein calculating the phase response comprises subtracting the first phase estimate and the phase adjustment value from the second phase estimate.

Example 3. The method of example 2, wherein making the first measurement comprises: generating a first sinusoidal signal having the first measuring frequency in the first receiving channel, wherein the first measuring frequency is within a frequency band of the first AFE filter; and sampling, by a first ADC of the first receiving channel, the first sinusoidal signal to generate first ADC output data while the first AFE filter is bypassed.

Example 4. The method of example 3, wherein making the second measurement comprises: generating a second sinusoidal signal having the first measuring frequency in the first receiving channel; filtering, by the first AFE filter, the second sinusoidal signal; and sampling, by the first ADC of the first receiving channel, an output of the first AFE filter to generate second ADC output data.

Example 5. The method of example 4, wherein a first timing phase offset between the first sinusoidal signal and the first ADC while making the first measurement is a same as a second timing phase offset between the second sinusoidal signal and the first ADC while making the second measurement such that the phase adjustment value between the second measurement and the first measurement is zero.

Example 6. The method of example 4, wherein a first timing phase offset between the first sinusoidal signal and the first ADC while making the first measurement is different from a second timing phase offset between the second sinusoidal signal and the first ADC while making the second measurement such that the phase adjustment value between the second measurement and the first measurement is non-zero.

Example 7. The method of example 6, wherein making the first measurement further comprises: generating a third sinusoidal signal having the first measuring frequency in a second receiving channel of the RFIC; and sampling, by a second ADC of the second receiving channel, the third sinusoidal signal to generate third ADC output data while a second AFE filter of the second receiving channel is bypassed; and wherein making the second measurement further comprises: generating a fourth sinusoidal signal having the first measuring frequency in the second receiving channel; and sampling, by the second ADC of the second receiving channel, the fourth sinusoidal signal to generate fourth ADC output data while the second AFE filter of the second receiving channel is bypassed.

Example 8. The method of example 7, further comprising: generating a third phase estimate for the second receiving channel at the first measuring frequency using the third ADC output data; and generating a fourth phase estimate for the second receiving channel at the first measuring frequency using the fourth ADC output data, wherein the phase adjustment value is determined based on the third phase estimate and the fourth phase estimate.

Example 9. The method of example 8, wherein determining the phase adjustment value comprises computing a difference between the fourth phase estimate and the third phase estimate.

Example 10. In an example, a method of characterizing a radio frequency integrated circuit (RFIC) having multiple receiving channels is disclosed, wherein each of the receiving channels has a mixer, an analog front end (AFE) filter coupled to the mixer, and an analog-to-digital converter (ADC) coupled to the AFE filter, wherein the method comprises: bypassing a first AFE filter in a first receiving channel of the RFIC and bypassing a second AFE filter in a second receiving channel of the RFIC; calculating a first frequency estimate of the RFIC at a first measuring frequency using first data captured by the ADCs of the RFIC while the first AFE filter and the second AFE filter are bypassed, wherein the first frequency estimate comprises a first amplitude estimate and a first phase estimate for the first receiving channel, and comprises a second phase estimate for the second receiving channel; enabling the first AFE filter in the first receiving channel and bypassing the second AFE filter in the second receiving channel; calculating a second frequency estimate of the RFIC at the first measuring frequency using second data captured by the ADCs while the first AFE filter is enabled and the second AFE filter is bypassed, wherein the second frequency estimate comprises a third amplitude estimate and a third phase estimate for the first receiving channel, and comprises a fourth phase estimate for the second receiving channel; and calculating a frequency response of the first AFE filter at the first measuring frequency, comprising: calculating an amplitude response of the first AFE filter based on the first amplitude estimate and the third amplitude estimate; and calculating a phase response of the first AFE filter based on the first phase estimate and the third phase estimate.

Example 11. The method of example 10, further comprising determining a phase difference by subtracting the second phase estimate from the fourth phase estimate, wherein calculating the amplitude response of the first AFE filter comprises dividing the third amplitude estimate by the first amplitude estimate, wherein calculating the phase response of the first AFE filter comprises subtracting the first phase estimate and the phase difference from the third phase estimate.

Example 12. The method of example 10, further comprising capturing the first data before calculating the first frequency estimate, comprising: generating a first test tone in the first receiving channel and a second test tone in the second receiving channel, wherein the first test tone and the second test tone have the first measuring frequency; and converting, by a first ADC in the first receiving channel and a second ADC in the second receiving channel, the first test tone and the second test tone into a first plurality of digital samples while the first AFE filter and the second AFE filter are bypassed.

Example 13. The method of example 12, further comprising capturing the second data before calculating the second frequency estimate, comprising: generating a third test tone in the first receiving channel and a fourth test tone in the second receiving channel, wherein the third test tone and the fourth test tone have the first measuring frequency; filtering, by the first AFE filter in the first receiving channel, the third test tone; and converting, by the first ADC and the second ADC, an output of the first AFE filter and the fourth test tone into a second plurality of digital samples while the first AFE filter is enabled and the second AFE filter is bypassed.

Example 14. The method of example 13, wherein the first ADC and the second ADC are synchronized, wherein a first timing phase offset between the first test tone and the first ADC while capturing the first data is different from a second timing phase offset between the third test tone and the first ADC while capturing the second data, such that the first phase estimate and the second phase estimate have a same first random phase component, and the third phase estimate and the fourth phase estimate have a same second random phase component.

Example 15. The method of example 10, wherein the first data captured by the ADCs include first digital samples from the first receiving channel and second digital samples from the second receiving channel, wherein calculating the first frequency estimate of the RFIC comprises: multiplying the first digital samples and the second digital samples with a complex tone to shift the first digital samples and the second digital samples to baseband, wherein after being shifted to baseband, the first digital samples and the second digital samples have complex values; and after the multiplying the first digital samples and the second digital samples, calculating a first sum of the first digital samples and a second sum of the second digital samples, wherein a magnitude of the first sum and a phase of the first sum are the first amplitude estimate and the first phase estimate, respectively, and wherein a phase of the second sum is the second phase estimate.

Example 16. The method of example 15, wherein calculating the first frequency estimate of the RFIC further comprises, before multiplying the first digital samples and the second digital samples with a complex tone, pre-processing the first digital samples and the second digital samples, comprising: removing direct current (DC) components from the first digital samples and the second digital samples; and after removing the DC components, applying a windowing function to the first digital samples and the second digital samples.

Example 17. The method of example 15, wherein the second data captured by the ADCs include third digital samples from the first receiving channel and fourth digital samples from the second receiving channel, wherein calculating the second frequency estimate of the RFIC comprises: multiplying the third digital samples and the fourth digital samples with the complex tone to shift the third digital samples and the fourth digital samples to baseband, wherein after being shifted to baseband, the third digital samples and the fourth digital samples have complex values; and after multiplying the third digital samples and the fourth digital samples, calculating a third sum of the third digital samples and a fourth sum of the fourth digital samples, wherein a magnitude of the third sum and a phase of the third sum are the third amplitude estimate and the third phase estimate, respectively, and wherein a phase of the fourth sum is the fourth phase estimate.

Example 18: In an example, a radar system includes: a first monolithic microwave integrated circuit (MMIC), wherein the first MMIC comprises: a first input terminal configured to receive a local oscillator (LO) signal; a test signal generator (TSG) configured to generate a sinusoidal signal at a user-specified frequency; and a plurality of receiving channels, wherein each of the plurality of receiving channels comprises: a mixer having a normal operation mode and a calibration mode, wherein in the normal operation mode, the mixer is configured to down-convert a radio frequency (RF) signal from an external antenna, wherein in the calibration mode, the mixer is configured to generate a test tone; an analog front end (AFE) filter having a bypass mode and a normal operation mode, wherein in the normal operation mode, the AFE filter is configured to filter an output signal of the mixer and is configured to generate, at an output terminal of the AFE filter, a filtered mixer output signal, wherein in the bypass mode, the AFE filter is bypassed and is configured to pass through, at the output terminal of the AFE filter, the output signal of the mixer; and an analog-to-digital converter (ADC) coupled to the output terminal of the AFE filter. The radar system further includes a controller, wherein the controller is configured to calibrate a first AFE filter in a first receiving channel of the MMIC by: setting a first mixers in a first receiving channel and a second mixer in a second receiving channel in the calibration mode to generate a first test tone in the first receiving channel and a second test tone in the second receiving channel, wherein the first test tone and the second test tone have a first measuring frequency within a frequency band of the first AFE filter; setting a first AFE filter in the first receiving channel and a second AFE filter in the second receiving channel in the bypass mode; calculating a first frequency estimate of the first AFE filter and a second frequency estimate of the second AFE filter using first ADC output data captured when the first AFE filter and the second AFE filter are bypassed; setting the first AFE filter in the normal operation mode and setting the second AFE filter in the bypass mode; calculating a third frequency estimate of the first AFE filter and a fourth frequency estimate of the second AFE filter using second ADC output data captured when the first AFE filter is in the normal operation mode and the second AFE filter is in the bypass mode; and calculating a first amplitude response and a first phase response of the first AFE filter at the first measuring frequency using the first frequency estimate and the third frequency estimate.

Example 19. The radar system of example 18, further comprising synchronizing the second frequency estimate with the fourth frequency estimate, wherein the synchronizing comprises determining a phase shift between the fourth frequency estimate and the second frequency estimate, wherein each of the first frequency estimate, the second frequency estimate, the third frequency estimate, and the fourth frequency estimate includes a respective phase estimate, wherein the first frequency estimate and the third frequency estimate include a first amplitude estimate and a third amplitude estimate, respectively, wherein calculating the first amplitude response and the first phase response of the first AFE filter comprises: calculating the first amplitude response based on the first amplitude estimate and the third amplitude estimate; and calculating the first phase response based on the phase estimate of the first frequency estimate, the phase estimate of the third frequency estimate, and the phase shift.

Example 20. The radar system of example 19, wherein the first amplitude response is calculated by dividing the third amplitude estimate by the first amplitude estimate, wherein the phase shift is calculated by subtracting the phase estimate of the second frequency estimate from the phase estimate of the fourth frequency estimate, wherein the first phase response is calculated by subtracting the phase estimate of the first frequency estimate and the phase shift from the phase estimate of the third frequency estimate.

Example 21. The radar system of example 18, wherein the second ADC output data is captured while a third test tone and a fourth test tone are generated in the first receiving channel and the second receiving channel, respectively, wherein the third test tone and the fourth test tone have the first measuring frequency.

Example 22. The radar system of example 21, wherein the first test tone, the second test tone, the third test tone, and the fourth test tone are unsynchronized with the ADCs such that the first frequency estimate and the second frequency estimate have a same first random phase component, and the third frequency estimate and the fourth frequency estimate have a same second random phase component.

Example 23. The radar system of example 21, wherein the first test tone, the second test tone, the third test tone, and the fourth test tone are synchronized with the ADCs such that the first frequency estimate, the second frequency estimate, the third frequency estimate, and the fourth frequency estimate have a same fixed phase component.

Example 24. The radar system of example 18, further comprising a second MMIC, wherein the second MMIC comprises a local oscillator (LO) circuit, wherein an output of the LO circuit is coupled to the first input terminal of the first MMIC.

While this invention has been described with reference to illustrative examples, this description is not intended to be construed in a limiting sense. Various modifications and combinations of the illustrative examples, as well as other examples of the invention, will be apparent to persons skilled in the art upon reference to the description. It is therefore intended that the appended claims encompass any such modifications or examples.

What is claimed is:

1. A method of calibrating a radio frequency integrated circuit (RFIC) having multiple receiving channels, wherein each of the receiving channels has a mixer, an analog front end (AFE) filter coupled to the mixer, and an analog-to-digital converter (ADC) coupled to the AFE filter, wherein the method comprises:
   making a first measurement of the RFIC at a first measuring frequency;
   generating a first amplitude estimate and a first phase estimate for a first receiving channel of the RFIC at the first measuring frequency using the first measurement, wherein a first AFE filter of the first receiving channel is bypassed while the first measurement is being made;
   making a second measurement of the RFIC at the first measuring frequency;
   generating a second amplitude estimate and a second phase estimate for the first receiving channel at the first measuring frequency using the second measurement, wherein the first AFE filter of the first receiving channel is turned on while the second measurement is being made; and
   calculating a frequency response of the first AFE filter at the first measuring frequency, comprising:
      calculating an amplitude response of the first AFE filter at the first measuring frequency based on the second amplitude estimate and the first amplitude estimate; and
      calculating a phase response of the first AFE filter at the first measuring frequency based on the first phase estimate and the second phase estimate.

2. The method of claim 1, further comprising determining a phase adjustment value between the second measurement and the first measurement, wherein calculating the amplitude response comprises dividing the second amplitude estimate by the first amplitude estimate, and wherein calculating the phase response comprises subtracting the first phase estimate and the phase adjustment value from the second phase estimate.

3. The method of claim 2, wherein making the first measurement comprises:
   generating a first sinusoidal signal having the first measuring frequency in the first receiving channel, wherein the first measuring frequency is within a frequency band of the first AFE filter; and
   sampling, by a first ADC of the first receiving channel, the first sinusoidal signal to generate first ADC output data while the first AFE filter is bypassed.

4. The method of claim 3, wherein making the second measurement comprises:
   generating a second sinusoidal signal having the first measuring frequency in the first receiving channel;
   filtering, by the first AFE filter, the second sinusoidal signal; and
   sampling, by the first ADC of the first receiving channel, an output of the first AFE filter to generate second ADC output data.

5. The method of claim 4, wherein a first timing phase offset between the first sinusoidal signal and the first ADC while making the first measurement is a same as a second timing phase offset between the second sinusoidal signal and the first ADC while making the second measurement such that the phase adjustment value between the second measurement and the first measurement is zero.

6. The method of claim 4, wherein a first timing phase offset between the first sinusoidal signal and the first ADC while making the first measurement is different from a second timing phase offset between the second sinusoidal signal and the first ADC while making the second measurement such that the phase adjustment value between the second measurement and the first measurement is non-zero.

7. The method of claim 6, wherein making the first measurement further comprises:
   generating a third sinusoidal signal having the first measuring frequency in a second receiving channel of the RFIC; and
   sampling, by a second ADC of the second receiving channel, the third sinusoidal signal to generate third ADC output data while a second AFE filter of the second receiving channel is bypassed; and
   wherein making the second measurement further comprises:
      generating a fourth sinusoidal signal having the first measuring frequency in the second receiving channel; and
      sampling, by the second ADC of the second receiving channel, the fourth sinusoidal signal to generate fourth ADC output data while the second AFE filter of the second receiving channel is bypassed.

8. The method of claim 7, further comprising:
   generating a third phase estimate for the second receiving channel at the first measuring frequency using the third ADC output data; and
   generating a fourth phase estimate for the second receiving channel at the first measuring frequency using the fourth ADC output data, wherein the phase adjustment value is determined based on the third phase estimate and the fourth phase estimate.

9. The method of claim 8, wherein determining the phase adjustment value comprises computing a difference between the fourth phase estimate and the third phase estimate.

10. A method of characterizing a radio frequency integrated circuit (RFIC) having multiple receiving channels, wherein each of the receiving channels has a mixer, an analog front end (AFE) filter coupled to the mixer, and an analog-to-digital converter (ADC) coupled to the AFE filter, wherein the method comprises:
   bypassing a first AFE filter in a first receiving channel of the RFIC and bypassing a second AFE filter in a second receiving channel of the RFIC;
   calculating a first frequency estimate of the RFIC at a first measuring frequency using first data captured by the ADCs of the RFIC while the first AFE filter and the second AFE filter are bypassed, wherein the first frequency estimate comprises a first amplitude estimate and a first phase estimate for the first receiving channel, and comprises a second phase estimate for the second receiving channel;
   enabling the first AFE filter in the first receiving channel and bypassing the second AFE filter in the second receiving channel;
   calculating a second frequency estimate of the RFIC at the first measuring frequency using second data captured by the ADCs while the first AFE filter is enabled and the second AFE filter is bypassed, wherein the second frequency estimate comprises a third amplitude estimate and a third phase estimate for the first receiving channel, and comprises a fourth phase estimate for the second receiving channel; and calculating a frequency response of the first AFE filter at the first measuring frequency, comprising:
- calculating an amplitude response of the first AFE filter based on the first amplitude estimate and the third amplitude estimate; and
- calculating a phase response of the first AFE filter based on the first phase estimate and the third phase estimate.

11. The method of claim 10, further comprising determining a phase difference by subtracting the second phase estimate from the fourth phase estimate, wherein calculating the amplitude response of the first AFE filter comprises dividing the third amplitude estimate by the first amplitude estimate, wherein calculating the phase response of the first AFE filter comprises subtracting the first phase estimate and the phase difference from the third phase estimate.

12. The method of claim 10, further comprising capturing the first data before calculating the first frequency estimate, comprising:
- generating a first test tone in the first receiving channel and a second test tone in the second receiving channel, wherein the first test tone and the second test tone have the first measuring frequency; and
- converting, by a first ADC in the first receiving channel and a second ADC in the second receiving channel, the first test tone and the second test tone into a first plurality of digital samples while the first AFE filter and the second AFE filter are bypassed.

13. The method of claim 12, further comprising capturing the second data before calculating the second frequency estimate, comprising:
- generating a third test tone in the first receiving channel and a fourth test tone in the second receiving channel, wherein the third test tone and the fourth test tone have the first measuring frequency;
- filtering, by the first AFE filter in the first receiving channel, the third test tone; and
- converting, by the first ADC and the second ADC, an output of the first AFE filter and the fourth test tone into a second plurality of digital samples while the first AFE filter is enabled and the second AFE filter is bypassed.

14. The method of claim 13, wherein the first ADC and the second ADC are synchronized, wherein a first timing phase offset between the first test tone and the first ADC while capturing the first data is different from a second timing phase offset between the third test tone and the first ADC while capturing the second data, such that the first phase estimate and the second phase estimate have a same first random phase component, and the third phase estimate and the fourth phase estimate have a same second random phase component.

15. The method of claim 10, wherein the first data captured by the ADCs include first digital samples from the first receiving channel and second digital samples from the second receiving channel, wherein calculating the first frequency estimate of the RFIC comprises:
- multiplying the first digital samples and the second digital samples with a complex tone to shift the first digital samples and the second digital samples to baseband, wherein after being shifted to baseband, the first digital samples and the second digital samples have complex values; and
- after the multiplying the first digital samples and the second digital samples, calculating a first sum of the first digital samples and a second sum of the second digital samples, wherein a magnitude of the first sum and a phase of the first sum are the first amplitude estimate and the first phase estimate, respectively, and wherein a phase of the second sum is the second phase estimate.

16. The method of claim 15, wherein calculating the first frequency estimate of the RFIC further comprises, before multiplying the first digital samples and the second digital samples with a complex tone, pre-processing the first digital samples and the second digital samples, comprising:
- removing direct current (DC) components from the first digital samples and the second digital samples; and
- after removing the DC components, applying a windowing function to the first digital samples and the second digital samples.

17. The method of claim 15, wherein the second data captured by the ADCs include third digital samples from the first receiving channel and fourth digital samples from the second receiving channel, wherein calculating the second frequency estimate of the RFIC comprises:
- multiplying the third digital samples and the fourth digital samples with the complex tone to shift the third digital samples and the fourth digital samples to baseband, wherein after being shifted to baseband, the third digital samples and the fourth digital samples have complex values; and
- after multiplying the third digital samples and the fourth digital samples, calculating a third sum of the third digital samples and a fourth sum of the fourth digital samples, wherein a magnitude of the third sum and a phase of the third sum are the third amplitude estimate and the third phase estimate, respectively, and wherein a phase of the fourth sum is the fourth phase estimate.

* * * * *